Jan. 12, 1960        N. I. BOHLIN        2,920,847
AUXILIARY RELEASE MECHANISM FOR AIRPLANE EJECTION SEAT

Filed Oct. 19, 1956        3 Sheets-Sheet 1

Inventor
Nils Ivar Bohlin

Jan. 12, 1960  N. I. BOHLIN  2,920,847
AUXILIARY RELEASE MECHANISM FOR AIRPLANE EJECTION SEAT
Filed Oct. 19, 1956  3 Sheets-Sheet 2

Inventor
Nils Ivar Bohlin

Jan. 12, 1960          N. I. BOHLIN          2,920,847
AUXILIARY RELEASE MECHANISM FOR AIRPLANE EJECTION SEAT
Filed Oct. 19, 1956          3 Sheets-Sheet 3
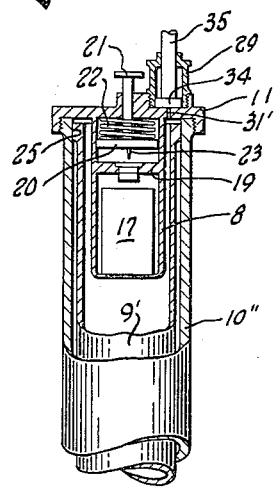
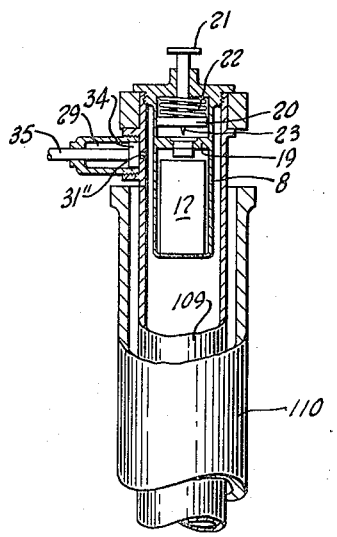
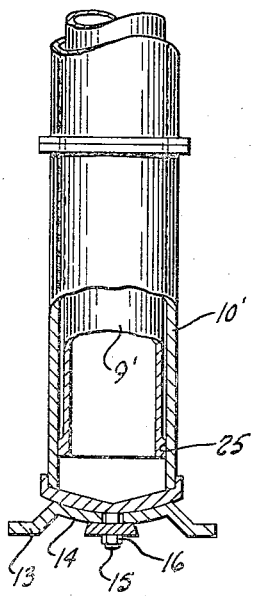
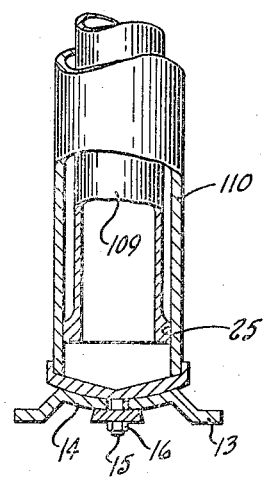
Nils Ivar Bohlin United States Patent Office 2,920,847
Patented Jan. 12, 1960

2,920,847

AUXILIARY RELEASE MECHANISM FOR AIRPLANE EJECTION SEAT

Nils I. Bohlin, Linkoping, Sweden, assignor to Svenska Aeroplan Aktiebolaget, Linkoping, Sweden, a corporation of Sweden Application October 19, 1956, Serial No. 617,149

Claims priority, application Sweden October 19, 1955

3 Claims. (Cl. 244—122)

This invention relates to aircraft ejection seats and refers more particularly to means on an aircraft ejection seat for actuating an auxiliary release or servo mechanism on the seat after the seat has reached a predetermined point in its ejecting movement out of an airplane in which it is installed.

As is well known, the speed of modern high performance airplanes creates serious problems when emergency escape from such aircraft becomes necessary in flight; and to overcome these problems mechanical devices are employed which assist the crew to leave the airplane in an emergency. If an airman left such an airplane simply by jumping from it, his body would immediately be subjected to the force of the air blast created by forward motion of the plane, by which he might be violently thrown against the tail surfaces or other parts of the ship.

It has therefore become conventional to provide so-called ejection seats for crew members of high speed aircraft, and particularly in military airplanes. With such a mechanism, the airman confronted with the need for leaving an airplane in flight actuates an emergency control, and thereupon mechanism in the airplane propels his seat through a hatch or canopy opening, literally throwing the flier clear of the ship. The airman is of course strapped to the seat as it leaves the airplane, and is provided with a parachute which is also secured to his person. In some instances flotation gear and an emergency oxygen supply accompany the airman out of the distressed airplane.

Obviously a very substantial force is required to propel the airman, his seat, and the accompanying emergency equipment out of the plane, and ejection of the seat must be positive and certain. Such forceful ejection of the seat is usually provided for by means of a so-called ejection gun, comprising a pair of elongated telescoping members, one of which is fixed in the airplane and the other of which carries the seat. Normally these two elongated members are disposed in substantially fully telescoped relation, but when the mechanism for seat ejection is actuated a charge of powder housed in the members is exploded, generating gas under pressure which axially separates the elongated members and propels the seat carrying member out of the airplane.

After the seat begins its ejecting movement, it is usually necessary to provide for the actuation of an auxiliary release or servo mechanism on the seat, which effects release of the airman's safety belt or which frees a stabilizing drogue connected with the seat and by which tumbling of the seat is prevented after it leaves the airplane. Heretofore the mechanisms by which such auxiliary release devices were actuated included a part fixed on the airframe and which effected actuation of the auxiliary release mechanism in consequence of relative motion between the seat and the airframe. One commonly used expedient of this type was a static line, one end of which was fastened to the airplane and the other end of which was connected with a pin or other release means that was actuated when the seat reached a point in its travel at which all of the slack was taken up in the static line. Another means employed for actuation of an auxiliary release mechanism or servo comprised a shoulder or abutment fixed on the airframe and located in the path of travel of an actuator carried by the seat, so that as the seat was propelled to and beyond a predetermined position, established by the location of the abutment, the actuator was moved relative to the seat by its engagement with the abutment.

These prior expedients involved several disadvantages, not the least of which was the necessity for proper installation of the apparatus. For example, failure to secure a static line to either the airframe or the actuator of the release mechanism could be disastrous to an airman compelled to effect ejection of the seat in order to leave a distressed aircraft. Moreover, the fact that such devices necessitated additional assembly steps which might be overlooked or improperly performed complicated the installation and removal of the seat for normal maintenance.

By contrast, it is an object of the present invention to provide an auxiliary release or servo mechanism for an airplane ejection seat of the character described wherein actuation of the auxiliary mechanism takes place automatically at a predetermined position of the seat, the auxiliary release mechanism not being dependent for its actuation upon any connection, fixed or transient, between the airplane and the release mechanism.

It is another object of this invention to provide in an airplane ejection seat, of the type adapted to be propelled out of an airplane in response to detonation of a charge of explosive material, an actuator for an auxiliary release mechanism, which actuator is fixed with respect to the seat and is operated by the expanding gases of the exploding charge in a predetermined position of the seat.

Still another object of this invention resides in the provision of an airplane ejection seat having an actuator for an auxiliary release mechanism by which release of a safety belt, stabilizing drogue, or the like may be effected after ejecting movement of the seat out of its normal position has begun, and which actuator requires no special attention when the seat is installed in an airplane or disassembled therefrom for maintenance.

It is also an object of this invention to provide an ejection seat having an auxiliary release mechanism and means for actuating the auxiliary release mechanism by the pressure of the same expanding gases which expel the ejection seat out of an airplane in which it is installed.

With the above and other objects in view, which will appear as the description proceeds, this invention resides in the novel construction, combination and arrangement of parts substantially as hereinafter described and more particularly defined by the appended claims, it being understood that such changes in the precise mebodiment of the hereindisclosed invention may be made as come within the scope of the claims.

The accompanying drawings illustrate several complete examples of the physical embodiment of the invention constructed according to the best mode so far devised for the practical application of the principles thereof, and in which:

Figure 4 is a fragmentary side elevational view of the ejection gun, portions being shown in section, and with the gun members shown partly separated and in relative positions which obtain just prior to actuation of the auxiliary release mechanism;

Figure 5 is a view similiar to Figure 4, but showing the gun members in their relative positions at which the auxiliary release mechanism is actuated;

Figure 6 is a side elevational view, with portions shown in section, of an ejection gun embodying a modified version of the auxiliary release mechanism of this invention; and Figure 7 is a view similar to Figure 6 but illustrating an ejection gun embodying another modification of the auxiliary release mechanism.

Figure 1:
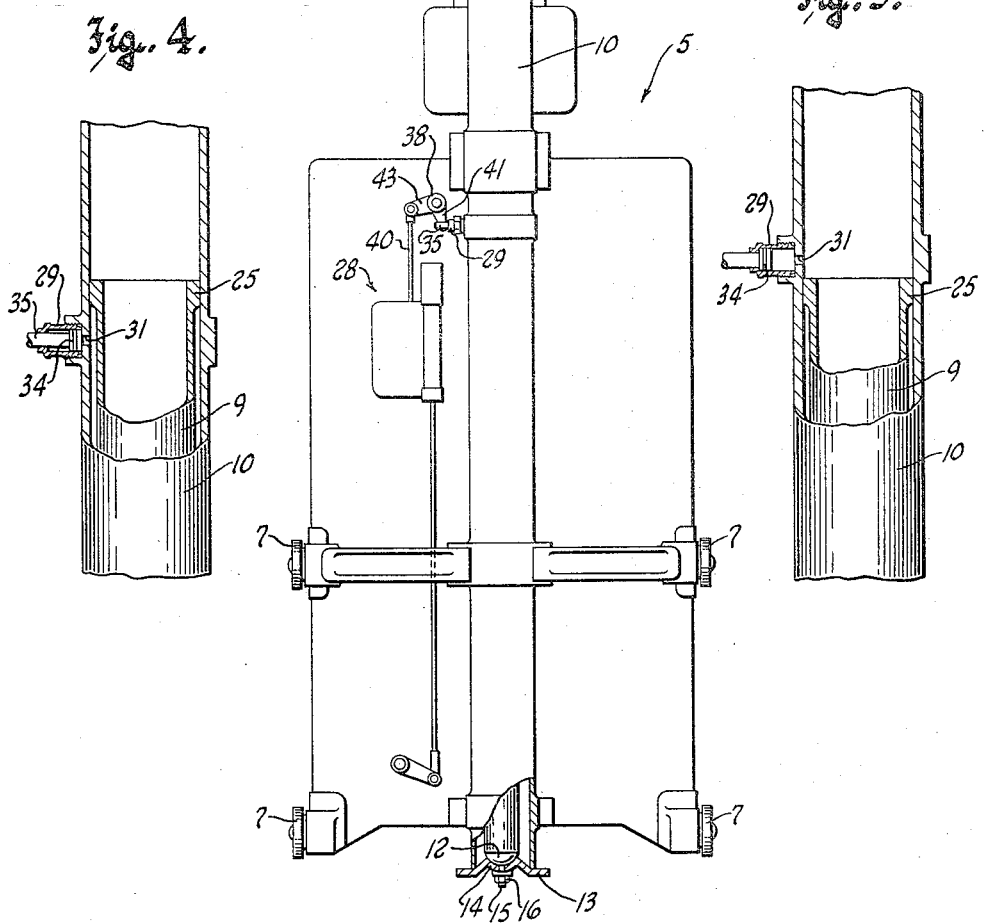
Figure 1 is a rear elevational view of an airplane ejection seat and seat ejection gun having auxiliary release and actuating mechanism embodying the principles of this invention.

Referring now to the accompanying drawings, in which like numerals designate like parts throughout the several views, the numeral 5 designates generally an airman's ejection seat, only the back of which is shown, and which is adapted to be installed in an airplane. As is well known, when an occupant of the seat actuates a jettisoning control (not shown) propulsion of the seat and its occupant away from the airplane is effected by means of an ejection gun, designated generally by 6, and the seat is guided or "aimed" for motion along a path substantially parallel to the vertical axis of the airplane by means of rollers 7 carried by the seat and engaged with guide rails (not shown) fixed to the airplane structure.

While the mechanism shown in the drawings is one whereby the seat is ejected upwardly out of an airplane, it will be obvious that the principles of this invention are equally applicable to an ejection gun adapted to propel the seat downwardly.

The ejection gun comprises, in general, inner and outer elongated telescoping members 9 and 10, respectively, normally disposed in substantially fully telescoped relationship with one another. The outer elongated member, to which the seat is fastened, is tubular and has a closure 11 at its upper end. The inner elongated member may also be tubular, and it is closed at its lower end by means of a substantially spherical wall 12.

An attachment fitting 13 provides for securement of the lower end of the inner elongated member to an airplane, and includes a socket portion 14 in which the substantially spherical end closure wall 12 of the inner member is received to swingably mount the inner member to the airplane. A stud 15 projecting downwardly from the spherical wall 12 extends through a substantially larger diameter hole in the attachment fitting and has a nut 16 threaded onto its lower end to anchor the inner member to the attachment fitting in a manner permitting the inner member to have limited swiveling motion.

Carried by and extending coaxially down into the closed end portion of the outer member from the end closure 11 is a substantially cylindrical firing mechanism housing 8, across which extends a transverse partition 19 spaced below the end closure. Beneath the partition is carried a charge of explosive material, such as a powder cartridge 17, and upon detonation of this charge, gases under high pressure are generated which react against the telescoped tubular members, propelling the tubular outer member axially off of the inner member and out of telescoped relationship therewith. The firing mechanism and powder cartridge may be accommodated in the interior of the upper end portion of the tubular inner member, as shown in Figure 1.

The transverse partition 19 supports a priming screw or detonator 20 by which detonation of the powder charge may be effected. A hammer 21, mounted for up and down movement in the firing mechanism housing, above the partition 19, is normally maintained in a cocked position spaced above the detonator and is biased toward the latter by means of a compression spring 22. As is well known to those skilled in the art, the hammer is connected with a suitable release mechanism (not shown) adapted to be manually actuated by the occupant of the seat and by which abrupt release of the hammer is effected, permitting the hammer to be propelled by the compression spring from its cocked position to a detonating position in which a firing pin 23 on the hammer percussively engages the detonator.

The free upper end of the inner elongated member has means thereon providing a snug but axially slideable substantially gas tight seal with the outer tubular member, which means may comprise a slightly enlarged diameter flange portion 25 defining a piston upon which the tubular outer member is axially movable. It will be seen that upon detonation of the powder cartridge the expanding gases generated thereby will react between the closed end of the tubular outer member and the substantially spherical end wall 12 of the inner member to propel the telescoped members apart, and the gases will be confined within the telescoped members by the piston-like seal means 25 on the inner member until the elongated members are fully separated.

The ejection seat of this invention includes an auxiliary release or servo mechanism of known type and construction, designated generally by 28, which is adapted to effect release of a stabilizing drogue, safety belt, or the like, at a predetermined interval after the powder charge has been detonated, and after the seat reaches a predetermined position in its path of ejecting movement. In the patent to Martin, No. 2,527,020, is shown such an auxiliary release or servo mechanism, for releasing a stabilizing drogue, employing a static line having one end connected in the aircraft. The auxiliary release mechanism of the present invention is secured to the seat, or is otherwise entirely carried by the outer tubular member, and its actuation and operation are in no wise dependent upon a connection between said mechanism and any part which is fixed with respect to the airplane wherein the seat is installed.

The actuating means for the auxiliary release mechanism comprises a housing or servo cylinder 29 mounted on the side wall of the tubular outer member and the interior of which is communicated with the interior of the tubular outer member through a port 31 in the side wall of said member. The port is axially spaced a substantial distance from the closed end of the tubular outer member, and the housing 29 is preferably located adjacent to the port so as to communicate directly therethrough with the interior of the outer member. A sealing ring 32 provides a gas tight connection between one end of the cylinder or housing and the side wall of the outer tubular member.

Movably mounted in the housing is a pressure responsive element 34, in this case shown as a piston reciprocable in the servo cylinder and having a stem 35 projecting axially from the housing through a closely fitting hole in the housing end wall, thereby affording guidance to the piston. Surrounding the piston is a sealing ring 36 which slideably engages the wall of the cylinder bore. Outward movement of the piston is transmitted to the auxiliary release mechanism, for actuation of the latter, by means of a bell crank 38, rockably mounted on a pivot pin 39 fixed to the seat. One arm 41 of the bell crank has its free end engaged in a slot 42 in the stem of the piston, while the other arm 43 of the bell crank has its free end connected to a rod 40, which is in turn connected to the release mechanism.

Figure 2:
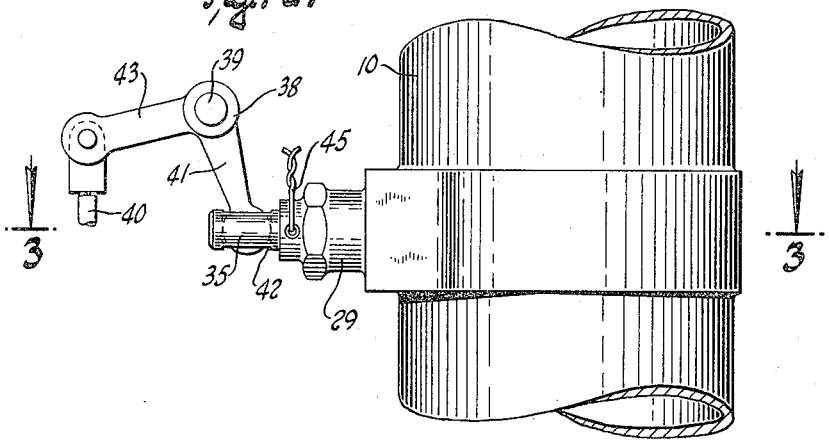
Figure 2 is an enlarged fragmentary side elevational view of the ejection gun and the actuating device mounted thereon.
Figure 3:
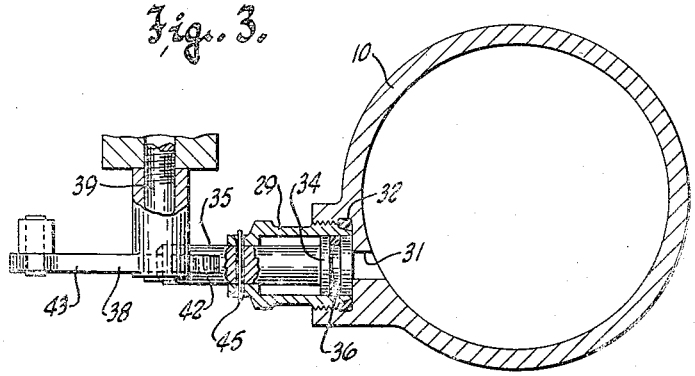
Figure 3 is a sectional view taken on the plane of the line 3—3 in Figure 2.

When the inner and outer elongated members are in normal substantially fully telescoped relationship and the powder charge is detonated, the expanding gases generated thereby are prevented from passing to the port 31 by the seal or piston 25 at the upper end of the inner elongated member. Such obstruction of flow of gases to the port 31 continues as the tubular outer member and the seat thereon move upwardly through the position shown in Figure 4; but after the outer member passes a position at which the port is substantially in radial alignment with the sealing means or piston on the inner member, and continues its movement to a relative position like that shown in Figure 5, the expanding gases enter the housing of the actuating device and operate the pressure responsive member—in this case propel the piston 34 outwardly in the servo cylinder to rock the bell crank clockwise as shown in Figure 2. This rocking motion of the bell crank effects actuation of the release mechanism 28 through the rod 40.

To prevent inadvertent actuation of the auxiliary release mechanism, a frangible wire 45 or the like is passed through holes in the piston stem 35 and the surrounding cylinder wall, which holes are in alignment when the piston is in its normal or retracted position. The force of the expanding gases entering the housing is, of course, sufficient to cause the piston to shear this wire.

In the embodiments of the invention shown in Figures 6 and 7 the pressure responsive element 34 begins to move substantially simultaneously with movement of the inner telescoping member when the explosive charge is detonated, because in each case the interior of the servo cylinder 29 is directly communicated at all times with the interiors of the telescoping members.

In the structure shown in Figure 6 there are two outer telescoping members, 10' and 10", normally maintained telescoped over an inner member 9' and in endwise abutting relationship with one another. The upper one 10" of the outer telescoping members is connected with the seat to propel the same, while the lower one 10' is fixed to the attachment fitting 13, the inner member 9' serving to provide a sealing connection with the two outer members and cooperating with them to define an expansion chamber as they move relatively apart in response to detonation of an explosive charge.

The servo cylinder 29 in the embodiment of the invention shown in Figure 6 projects axially upwardly from the end closure 11 of the upper member 10", and the port 31', communicating the interior of the servo cylinder with the interior of the expansion chamber, is located in the end closure 11.

In the embodiment shown in Figure 7 the outer telescoping member 110 is secured to the attachment fitting, while the inner member 109 is relatively movable and is attached to the seat. The inner member also carries the housing or servo cylinder 29, which extends laterally therefrom, above the upper edge of the outer elongated member. A port 31" opens directly to the interior of the inner member, through the wall thereof, from the servo cylinder.

It will be understood by those skilled in the art that any desired type of mechanism or actuator may be connected with the pressure responsive member in any of the above described embodiments of the invention.

From the foregoing description taken together with the accompanying drawings, it will be apparent that this invention provides automatic means for actuating an auxiliary release or servo mechanism carried by an aircraft ejection seat, wherein the servo mechanism is actuated only after the seat passes a predetermined position in the path of its ejecting motion, but wherein actuation of the servo mechanism is not dependent upon any connection between the seat or a part thereon and a fixed part on the airplane in which the ejection seat is installed. It will also be apparent that the ejection seat servo mechanism of this invention facilitates assembly and disassembly of the ejection seat, and that because it is actuated by the expanding gases of the charge of explosive material by which the seat is propelled, the actuation of the servo is entirely automatic and may be readily safetied against inadvertent actuation or displacement.

What is claimed as my invention is:

1. In an ejection seat gun: an outer tubular member having one end closed; an inner member telescoped into the other end of the outer member; means on the inner member cooperating with the closed end portion of the outer member to provide a combustion chamber in which gases from an explosive charge may expand and exert axial separating forces on said members; means on the outer member providing for securement thereof to an airplane seat; means on the inner member providing for securement thereof to an airplane; auxiliary mechanism fixed with respect to the outer member; means carried by the outer member for actuating said auxiliary mechanism, said last mentioned means comprising housing means, an element in said housing means which is movable in response to pressure, means operatively connecting said pressure responsive element with the auxiliary mechanism, and passage means having an inlet communicating with the interior of said outer tubular member at a location spaced a substantialy distance from the closed end of said outer member and an outlet communicating with the interior of said housing means; and seal means on the inner end portion of the inner member having sliding sealing engagement with the wall of the outer member and normally disposed between the closed end of the outer member and the mouth of said passage means to block communication between the combustion chamber and the interior of said housing means until after the expansion of gases in the combustion chamber has effected axial separation of said member to an extent such that the inlet of said passage means lies between the closed end of the outer member and said seal means on the inner member, whereupon such expanding gases may enter the housing means to exert pressure upon the pressure responsive element therein and thereby effect actuation of the auxiliary mechanism.

2. In an ejection seat gun: an outer tubular member having one end closed and having a laterally extending bore through its wall at a location spaced a substantial distance from the closed end thereof; an inner member telescoped into the other end of the outer member; means on the inner member cooperating with the closed end portion of the outer member to provide a combustion chamber in which gases from an explosive charge may expand in exert axial separating forces on said members; means on the outer member providing for securement thereof to an airplane seat; means on the inner member providing for securement thereof to an airplane; auxiliary mechanism fixed with respect to the outer member; a cylinder having a bore therethrough; means on the outer member securing the cylinder to the outer member with the bore of the cylinder in communication with said laterally extending bore in the outer member; a piston axially slidable in the cylinder and having a rod projecting from one end of the cylinder; a connection between said rod on the piston and the auxiliary release mechanism; and circumferential seal means on the inner end portion of the inner member having sliding sealing engagement with the wall of the outer member and normally disposed between the closed end of the outer member and said transverse bore therein to block communication between the combustion chamber and said transverse bore until after the expansion of gases in the combustion chamber has effected axial separation of said members to such an extent that said transverse bore lies between the closed end of the outer member and said seal means on the inner member, whereupon such expanding gases may enter the cylinder bore to exert axial displacing pressure upon the piston and thereby effect actuation of the auxiliary mechanism.

3. An airplane ejection seat of the type comprising a plurality of elongated substantially tubular members, normally disposed in telescoped relationship, one of which members is adapted to be fixed in an airplane and the other of which is movable relative to the first and has a seat secured to it for movement therewith out of the airplane in consequence of detonation of a charge of explosive material carried in the interior of said elongated members and reacting between them, said ejection seat being characterized by: a housing carried by said movable member; means defining a passage through a wall of the movable member, having its inlet opening to the interior of said movable member and its outlet opening to the interior of said housing, for admitting to the housing expanding gases generated by explosion of the explosive material; a pressure responsive element movably mounted in said housing; an auxiliary release mechanism carried by said movable member; and a connection between said pressure responsive element and the auxiliary release mechanism, so that actuation of the pressure responsive movement in response to gas pressure during movement of the seat out of an airplane effects actuation of the auxiliary reelase mechanism.

References Cited in the file of this patent
UNITED STATES PATENTS

| | | |
|---|---|---|
| Re. 23,981 | Stanley | Apr. 12, 1955 |
| 2,459,948 | Lobelle | Jan. 25, 1949 |
| 2,527,020 | Martin | Oct. 24, 1950 |
| 2,638,294 | Martin | May 12, 1953 |
| 2,736,522 | Wilson | Feb. 28, 1956 |
| 2,749,063 | Low | June 5, 1956 |